(12) United States Patent
Tix et al.

(10) Patent No.: US 11,942,726 B2
(45) Date of Patent: Mar. 26, 2024

(54) HEATED HOSE ELECTRICAL CONNECTORS

(71) Applicant: Graco Minnesota Inc., Minneapolis, MN (US)

(72) Inventors: Joseph E. Tix, Hastings, MN (US); Erich W. Beckmann, Minneapolis, MN (US); Stephen P. Schneider, Blaine, MN (US); Nicholas P. Peterson, Coon Rapids, MN (US); Mark J. Brudevold, Fridley, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 106 days.

(21) Appl. No.: 17/835,496

(22) Filed: Jun. 8, 2022

(65) Prior Publication Data

US 2022/0393403 A1 Dec. 8, 2022

Related U.S. Application Data

(60) Provisional application No. 63/202,365, filed on Jun. 8, 2021.

(51) Int. Cl.
*H01R 13/00* (2006.01)
*F16L 53/38* (2018.01)
*H01R 13/645* (2006.01)
*H01R 13/52* (2006.01)

(52) U.S. Cl.
CPC .......... *H01R 13/6456* (2013.01); *F16L 53/38* (2018.01); *H01R 13/5221* (2013.01)

(58) Field of Classification Search
CPC .. H01R 13/6456; H01R 13/5221; F16L 53/38
See application file for complete search history.

(56) References Cited

U.S. PATENT DOCUMENTS

| 3,443,759 A | * | 5/1969 | Frank ..................... B60S 1/482 91/401 |
| 3,771,108 A | | 11/1973 | Haffner et al. |
| 4,154,368 A | | 5/1979 | Bairunas et al. |
| 4,784,614 A | | 11/1988 | Sadigh-Behzadi |

(Continued)

FOREIGN PATENT DOCUMENTS

| WO | 2011015915 A1 | 2/2011 |
| WO | 2019191081 A1 | 10/2019 |
| WO | 2020136271 A1 | 7/2020 |

OTHER PUBLICATIONS

Partial European Search Report for EP Application No. 22177520.8, dated Oct. 26, 2022, pp. 11.

(Continued)

*Primary Examiner* — Phuong Chi Thi Nguyen
(74) *Attorney, Agent, or Firm* — Kinney & Lange, P. A.

(57) ABSTRACT

An electrical connector system for use with independently heated hoses includes a first electrical connector, a second electrical connector, a third electrical connector, and a fourth electrical connector. The first electrical connector includes a first key that mates with a second key of the second electrical connector. The third electrical connector includes a third key that mates with a fourth key of the fourth electrical connector. The first and second keys differ from the third and fourth keys, ensuring the electrical connectors are correctly connected.

20 Claims, 7 Drawing Sheets

(56) References Cited

U.S. PATENT DOCUMENTS

| | | | |
|---|---|---|---|
| 4,820,193 A | 4/1989 | Noorily | |
| 5,417,585 A | 5/1995 | Morin et al. | |
| 5,449,302 A * | 9/1995 | Yarbrough | H01R 13/645 |
| | | | 439/95 |
| 5,775,935 A | 7/1998 | Barna | |
| 6,256,881 B1 | 7/2001 | Starkey | |
| 6,443,759 B1 * | 9/2002 | Matsuda | H01R 4/22 |
| | | | 439/519 |
| 6,984,146 B1 * | 1/2006 | Boudreau | H01R 13/629 |
| | | | 439/488 |
| 7,410,386 B2 * | 8/2008 | Fabian | H01R 13/4367 |
| | | | 439/441 |
| 8,337,240 B2 | 12/2012 | Feldmeier et al. | |
| 9,225,099 B2 | 12/2015 | Omari et al. | |
| 2011/0259974 A1 | 10/2011 | Cooper et al. | |
| 2015/0114494 A1 | 4/2015 | Crawford | |

OTHER PUBLICATIONS

Extended European Search Report for EP Application No. 22177520. 8, dated Jan. 25, 2023, pp. 13.

* cited by examiner

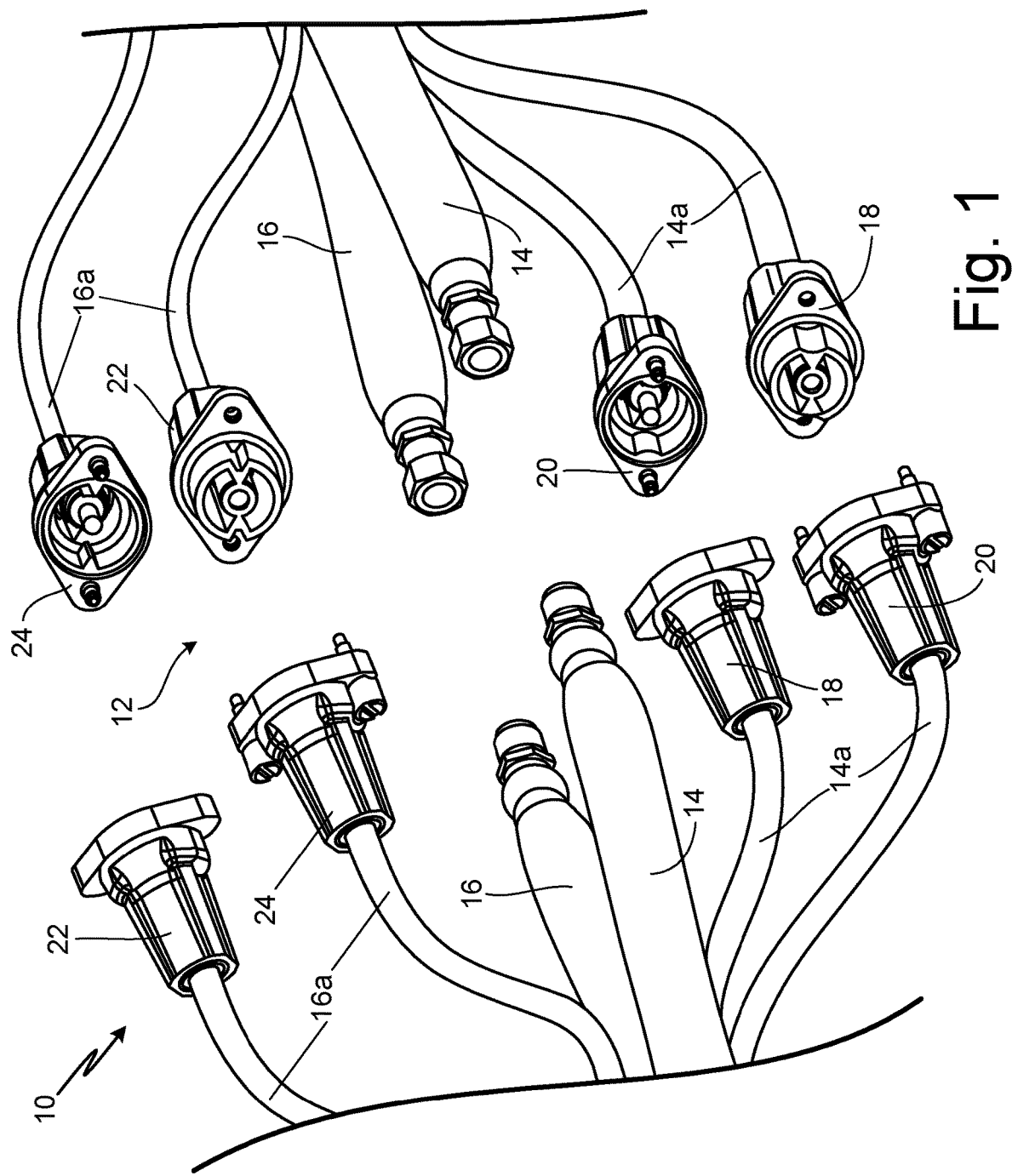

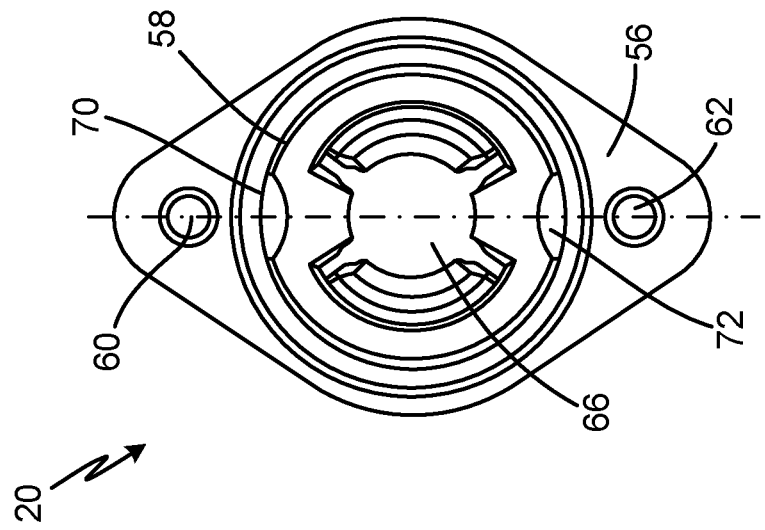
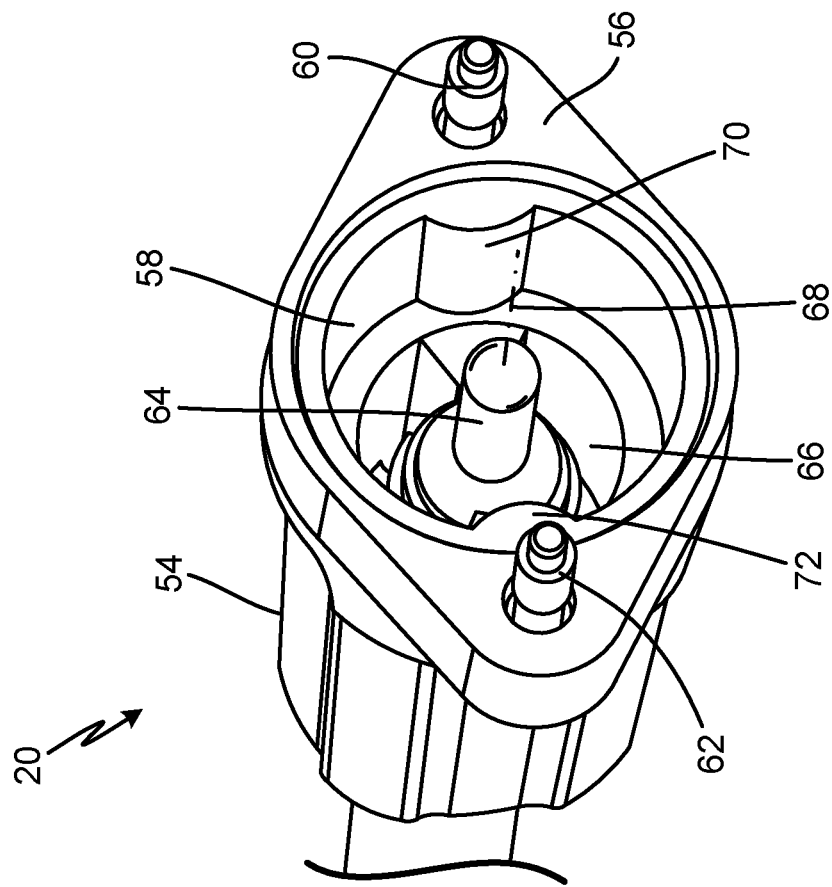
Fig. 3B
Fig. 3A

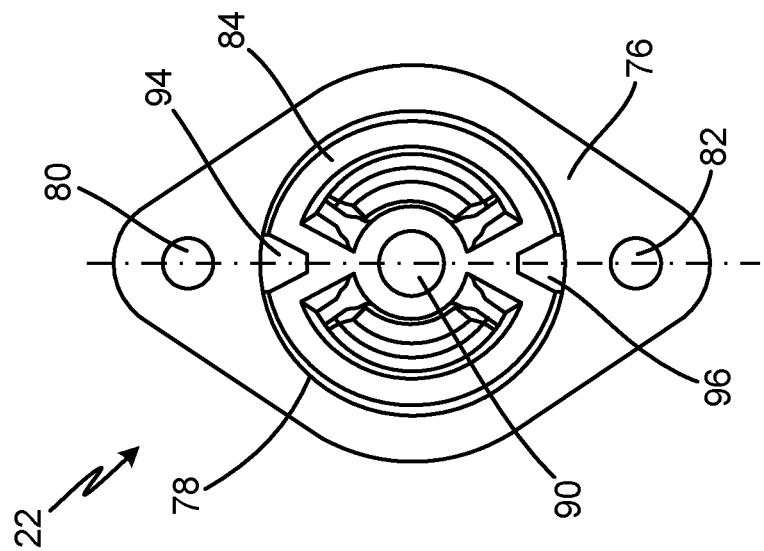
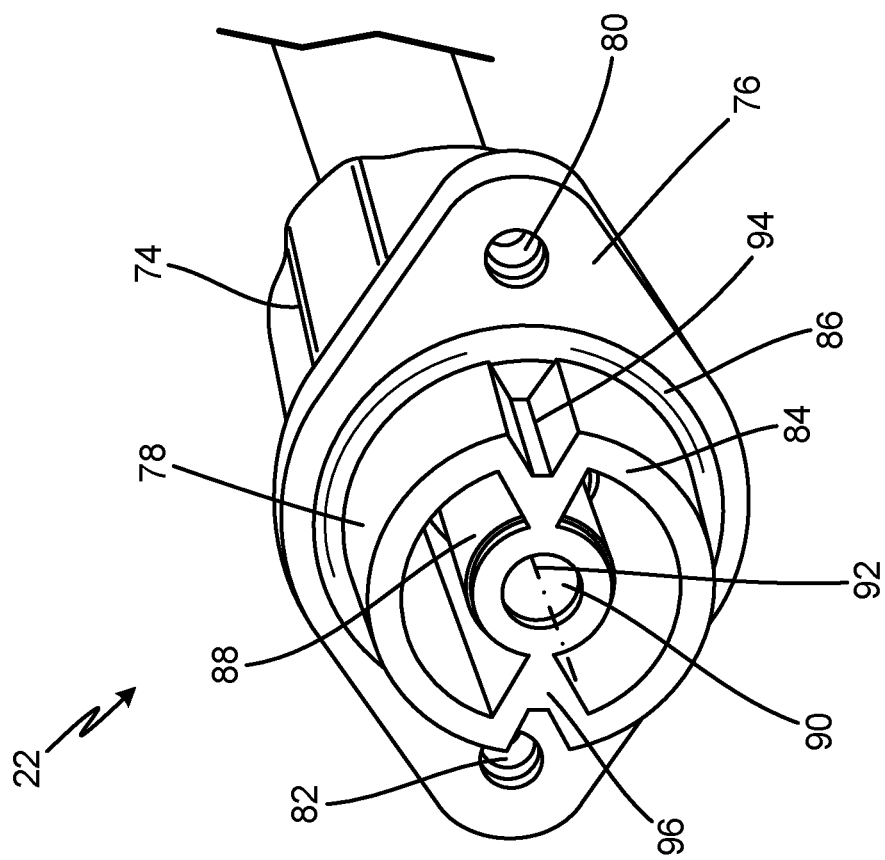
Fig. 5B
Fig. 5A

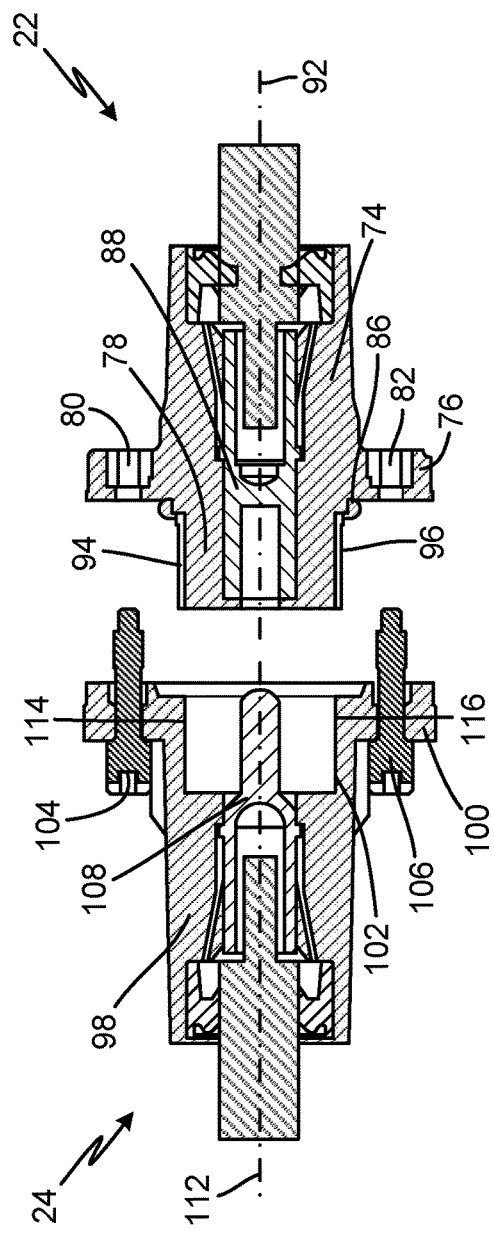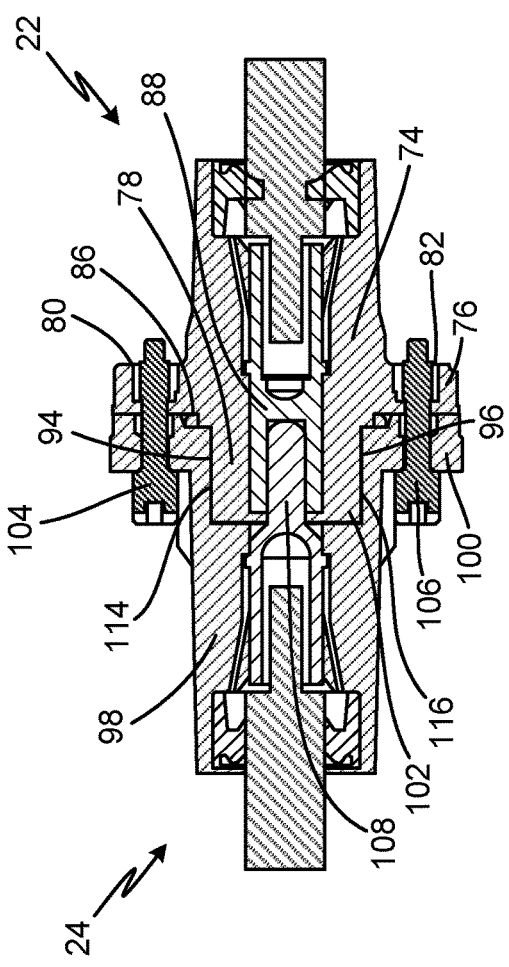

HEATED HOSE ELECTRICAL CONNECTORS

CROSS-REFERENCE TO RELATED APPLICATION(S)

This application claims the benefit of U.S. Provisional Application No. 63/202,365 filed Jun. 8, 2021 for "HEATED HOSE ELECTRICAL CONNECTORS," are hereby incorporated by reference in their entirety.

BACKGROUND

The present disclosure relates generally to electrical connectors, and more particularly to keyed electrical connectors used with electrically heated hoses of a plural component (e.g. fluid) dispensing system.

Multiple component (e.g., fluid) applicators include dispensing systems that receive separate inert material components, mix the components according to a predetermined ratio, and then dispense the components as an activated compound. For example, multiple component applicators are often used to dispense epoxies and polyurethanes that solidify after mixing of a resin component and an activating component, which are individually inert. Some dispensing systems include electrically heated hoses that increase the temperature of the material components flowing through each hose to a desired temperature, ensuring a proper activated mixture is achieved. The electrically heated hoses include electrical connectors that are used to electrically couple each heated hose segment to an electrical power source. Incorrectly connecting the electrical connectors can result in a decreased amount of electrical current supplied to the heated hoses, resulting in decreased performance of the electrically heated hoses.

SUMMARY

According to one aspect of the disclosure, an electrical connector system includes a first electrical connector, a second electrical connector, and third electrical connector, and a fourth electrical connector. The first electrical connector includes a first key. The second electrical connector includes a second key shaped to mate with the first key. The third electrical connector includes a third key. The fourth electrical connector includes a fourth key shaped to mate with the third key. The geometry of the first key differs from the geometry of the third key, and the geometry of the second key differs from the geometry of the fourth key.

According to another aspect of the disclosure, a heated hose assembly includes a first heated hose, a second heated hose, a first electrical connector, a second electrical connector, and third electrical connector, and a fourth electrical connector. The first heated hose is configured to transfer a first fluid component. The second heated hose is configured to transfer a second fluid component. The first electrical connector is electrically coupled to heating elements of the first heated hose, and the first electrical connector includes a first key. The second electrical connector is electrically coupled to heating elements of the first heated hose, and the second electrical connector includes a second key shaped to mate with the first key. The third electrical connector is electrically coupled to heating elements of the second heated hose, and the third electrical connector includes a third key. The fourth electrical connector is electrically coupled to heating elements of the second heated hose, and the fourth electrical connector includes a fourth key shaped to mate with the third key.

According to yet another aspect of the disclosure, a method of operating a heated hose assembly is disclosed. The method includes: providing a first heated hose configured to transfer a first fluid component, the first heated hose comprising a first electrical connector and a second electrical connector each electrically coupled to heating elements of the first heated hose; providing a second heated hose configured to transfer a second fluid component, the second heated hose comprising a third electrical connector and a fourth electrical connector each electrically coupled to heating elements of the second heated hose; electrically coupling the first electrical connector to the second electrical connector such that a first key of the first electrical connector mates with a second key of the second electrical connector; electrically coupling the third electrical connector to the fourth electrical connector such that a third key of the third electrical connector mates with a fourth key of the fourth electrical connector; supplying a first electric current through the first electrical connector and the second electrical connector to increase a temperature of the first fluid component transferring through the first heated hose; and supplying a second electric current through the third electrical connector and the fourth electrical connector to increase a temperature of the second fluid component transferring through the second heated hose.

BRIEF DESCRIPTION OF THE DRAWINGS

FIG. 1 is a perspective view of a heated hose assembly including an electrical connector system.

FIG. 3A is a perspective view of a second electrical connector.

FIG. 3B is a front view of the second electrical connector.

FIG. 5A is a perspective view of a third electrical connector.

FIG. 5B is a front view of the third electrical connector.

FIG. 7A is a cross-sectional view of the third and fourth electrical connectors disconnected.

FIG. 7B is a cross-sectional view of the third and fourth electrical connectors connected.

DETAILED DESCRIPTION

Figure 2B:
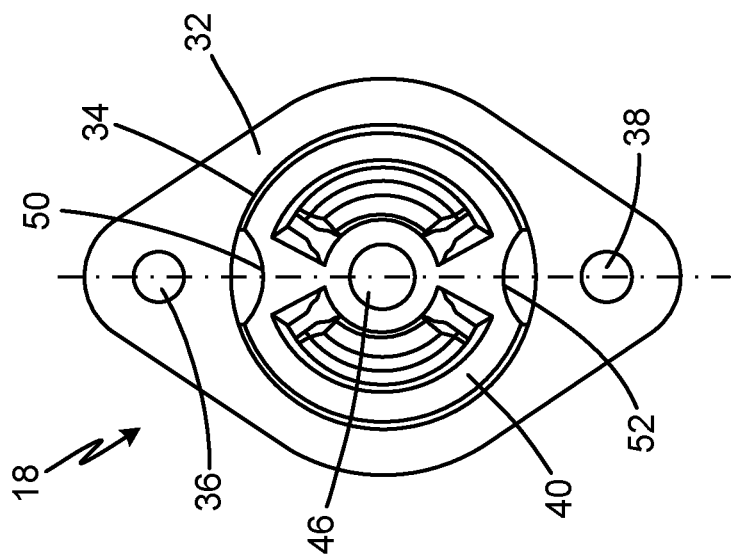
FIG. 2B is a front view of the first electrical connector.

FIG. 1 is a perspective view of heated hose assembly 10 including electrical connector system 12. Heated hose assembly 10 includes first heated hose 14, second heated hose 16, and electrical connector system 12. In some examples, heated hose assembly 10 can be used with multiple component dispensing systems that receive separate inert material components, mix the components according to a predetermined ratio, and then dispense the components as an activated compound. Heated hose assembly 10 includes electrically heated hoses that are configured to increase the temperature of the material components flowing through each hose, ensuring a proper activated mixture is achieved.

More specifically, first heated hose 14 and second heated hose 16 are configured to transfer a first fluid component and a second fluid component, respectively, the first and second fluid components can be different from each other. First heated hose 14 and second heated hose 16 are independently heated hoses that receive separate electrical power (e.g. electrical current) at the heating elements (e.g. wires) of each heated hose 14, 16 to heat each hose independently from the other hose. In some examples, the heating elements can be one or more copper wires wrapped around each of first heated hose 14 and second heated hose 16. Independently heating first heated hose 14 and second heated hose 16 allows a greater power density to be achieved, providing increased heating capabilities for each of first heated hose 14 and second heated hose 16. Electrical connector system 12 is coupled to first heated hose 14 and second heated hose 16. Electrical connector system 12 is configured to electrically couple the heating elements of each heated hose segment to an electrical power source.

Electrical connector system 12 includes first electrical connector 18, second electrical connector 20, third electrical connector 22, and fourth electrical connector 24. First electrical connector 18 is electrically coupled to heating elements 14a of first heated hose 14. Second electrical connector 20 is electrically coupled to heating elements 14a of first heated hose 14. Third electrical connector 22 is electrically coupled to heating elements 16a of second heated hose 16. Fourth electrical connector 24 is electrically coupled to heating elements 16a of second heated hose 16. In some examples, first electrical connector 18, second electrical connector 20, and heating elements 14a can be referred to as the first sub-assembly of heated hose assembly 10. Further, in some examples, third electrical connector 22, fourth electrical connector 24, and heating elements 16a can be referred to as the second sub-assembly of heated hose assembly 10. The first and second sub-assemblies of heated hose assembly 10 are configured to increase the temperature of the fluid components flowing through first heated hose 14 and second heated hose 16, respectively.

First electrical connector 18 is a male connector and second electrical connector 20 is a female connector, and first electrical connector 18 is configured to mate and connect with second electrical connector 20. Third electrical connector 22 is a male connector and fourth electrical connector 24 is a female connector, and third electrical connector 22 is configured to mate and connect with fourth electrical connector 24.

More specifically, both first electrical connector 18 and second electrical connector 20 include dual male/female connections. First electrical connector 18 includes an inner female connector positioned at a central axis of first electrical connector 18 and an outer male connector positioned radially outward from the inner female connector. Second electrical connector 20 includes an inner male connector positioned at a central axis of second electrical connector 20 and an outer female connector positioned radially outward from the inner male connector. As such, the inner female connector of first electrical connector 18 is configured to mate with the inner male connector of second electrical connector 20. The outer male connector of first electrical connector 18 is configured to mate with the outer female connector of second electrical connector 20. In some examples, the first male/female connection can be structural (e.g., inner male connector of second electrical connector 20 and inner female connector of first electrical connector 18) and the second male/female connection can be electrical (e.g., outer female connector of second electrical connector 20 and outer male connector of first electrical connector 18).

Likewise, both third electrical connector 22 and fourth electrical connector 24 include dual male/female connections. Third electrical connector 22 includes an inner female connector positioned at a central axis of third electrical connector 22 and an outer male connector positioned radially outward from the inner female connector. Fourth electrical connector 24 includes an inner male connector positioned at a central axis of fourth electrical connector 24 and an outer female connector positioned radially outward from the inner male connector. As such, the inner female connector of third electrical connector 22 is configured to mate with the inner male connector of fourth electrical connector 24. The outer male connector of third electrical connector 22 is configured to mate with the outer female connector of fourth electrical connector 24. In some examples, the third male/female connection can be structural (e.g., outer female connector of fourth electrical connector 24 and outer male connector of third electrical connector 22) and the fourth male/female connection can be electrical (e.g., inner male connector of fourth electrical connector 24 and inner female connector of third electrical connector 22).

In the embodiment shown, first heated hose 14 includes two of each of first electrical connector 18 and second electrical connector 20. Likewise, second heated hose 16 includes two of each of third electrical connector 22 and fourth electrical connector 24. In another embodiment, heated hoses 14, 16 can include more or less than two of each of electrical connectors 18, 20, 22, and 24. Each of the electrical connectors 18, 20, 22, and 24 are configured to be coupled to a mating connector to transfer electrical current from a power source to either first heated hose 14 or second heated hose 16.

As shown in FIG. 1, heated hose assembly 10 can include a plurality of heated hose segments that are connected to increase the overall length of first heated hose 14 and second heated hose 16. This allows a user to dispense the activated fluid component mixture at a location remote from the fluid component containers. Each of first heated hose 14 and second heated hose 16 includes fluid connectors at the distal ends of each hose 14, 16, fluidly coupling each hose segment to another hose segment to provide a flow path for the first fluid component and the second fluid component. Further, each of first heated hose 14 and second heated hose 16 include electrical connectors 18, 20, 22, and 24, electrically coupling each hose segment to another hose segment to allow electric current to transfer through each of the hose segments.

More specifically, one segment of first heated hose 14 includes first electrical connector 18 and another segment of first heated hose 14 includes second electrical connector 20. First electrical connector 18 and second electrical connector 20 are configured to mate and electrically connect, allowing electric current to transfer from one segment of first heated hose 14 to another segment of first heated hose 14. Similarly, one segment of second heated hose 16 includes third electrical connector 22 and another segment of second heated hose 16 includes fourth electrical connector 24. Third electrical connector 22 and fourth electrical connector 24 are configured to mate and electrically connect, allowing electric current to transfer from one segment of second heated hose 16 to another segment of second heated hose 16. As such, electrical connectors 18, 20, 22, and 24 ensure electric current is transferred to each segment of first heated hose 14 and second heated hose 16 to increase the temperature of first heated hose 14 and second heated hose 16.

Figure 2A:
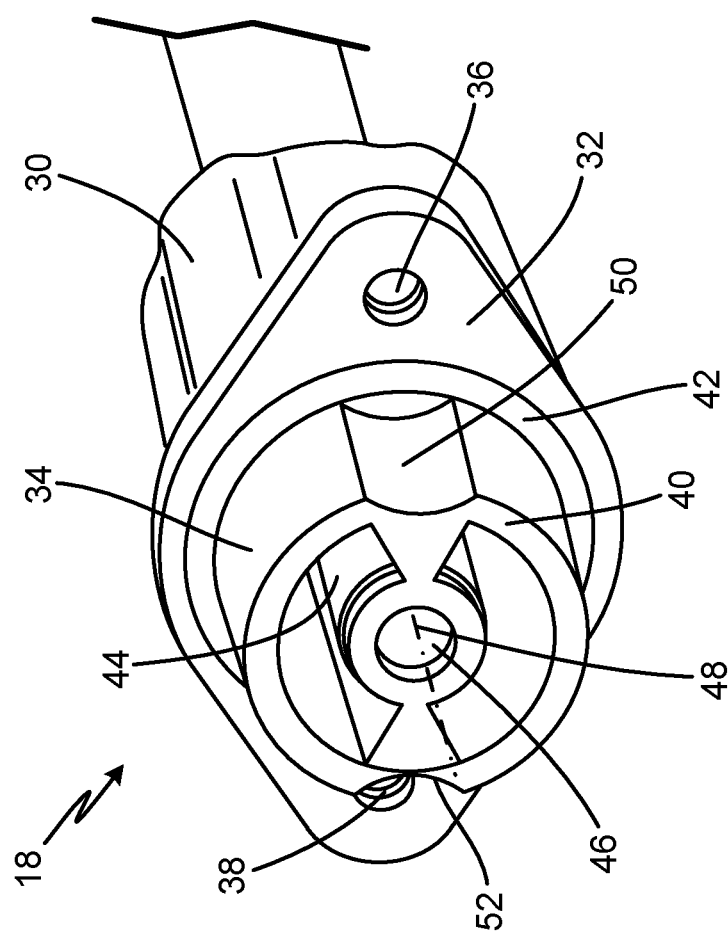
FIG. 2A is a perspective view of a first electrical connector.
Figure 4A:
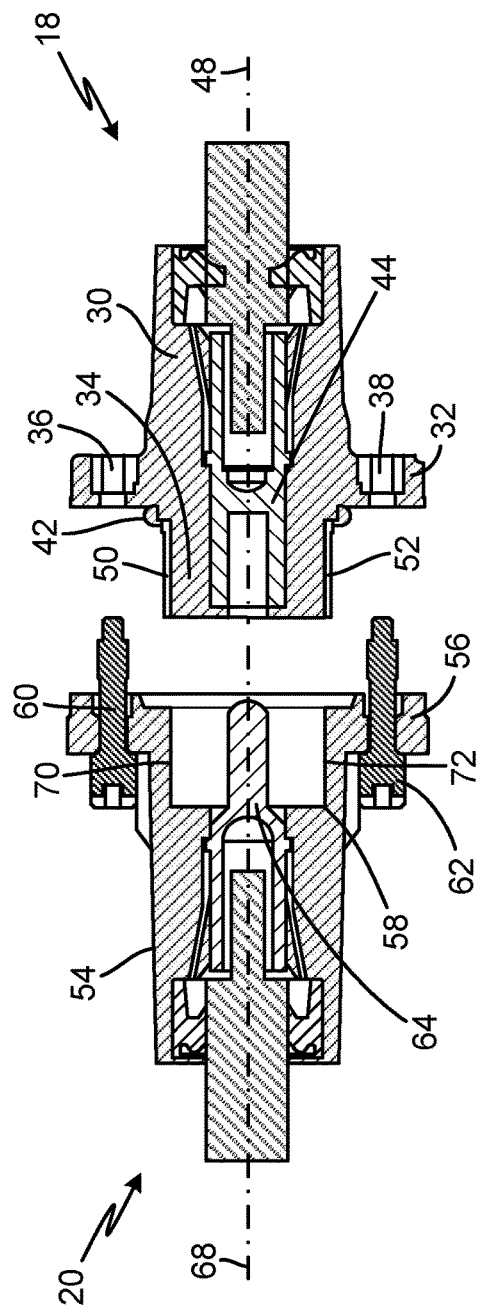
FIG. 4A is a cross-sectional view of the first and second electrical connectors disconnected.
Figure 4B:
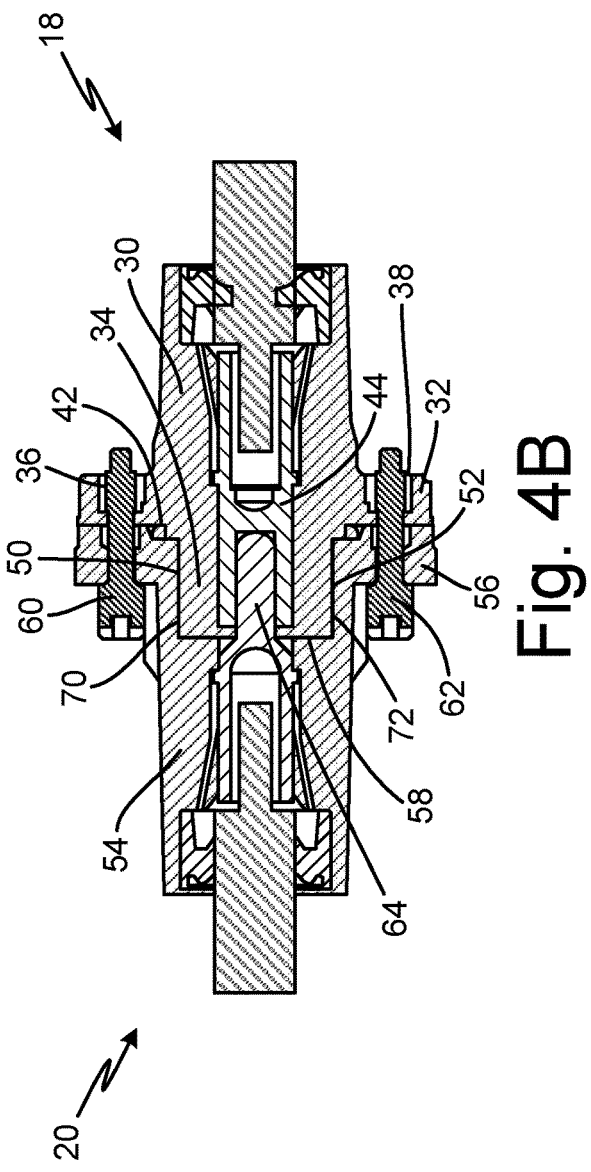
FIG. 4B is a cross-sectional view of the first and second electrical connectors connected.

FIG. 2A is a perspective view of first electrical connector 18. FIG. 2B is a front view of first electrical connector 18. FIG. 3A is a perspective view of second electrical connector 20. FIG. 3B is a front view of second electrical connector 20. FIG. 4A is a cross-sectional view of first electrical connector 18 and second electrical connector 20 disconnected. FIG. 4B is a cross-sectional view of first electrical connector 18 and second electrical connector 20 connected. FIGS. 2A-4B will be discussed together.

Referring to FIGS. 2A-2B, first electrical connector 18 includes first body 30, first flange 32, first key 34, first threaded insert 36, second threaded insert 38, first end face 40, first seal 42, first metallic connector 44, and first aperture 46. First body 30 is the main body portion of first electrical connector 18 that the other components of first electrical connector 18 are coupled. First flange 32 is positioned adjacent first body 30 and first flange 32 extends radially outward from first body 30. First flange 32 includes apertures extending through first flange 32, in which first threaded insert 36 and second threaded insert 38 are positioned. First threaded insert 36 and second threaded insert 38 are configured to accept and mate with fasteners, discussed further below. First threaded insert 36 is positioned 180 degrees from second threaded insert 38 about first axis 48. In some examples, first threaded insert 36 and second threaded insert 38 can be molded into first flange 32 during manufacturing of first electrical connector 18. In other examples, first threaded insert 36 and second threaded insert 38 can be coupled to first flange 32 after manufacturing of first electrical connector 18.

First key 34 is positioned adjacent first flange 32 and first key 34 extends axially outward from first flange 32 and first body 30, with respect to first axis 48 extending through a center of first flange 32 and first body 30. First key 34 is generally cylindrical in shape and includes first cutout 50 and second cutout 52 extending from first end face 40 of first key 34 to first flange 32. In the example shown, first cutout 50 and second cutout 52 include an arc or partial circle shaped cutout extending into the cylindrically shaped first key 34. In another example, first cutout 50 and second cutout 52 can have any desired shape, as long as first cutout 50 and second cutout 52 have identical shaped geometry. First cutout 50 is positioned 180 degrees from second cutout 52 about first axis 48. First end face 40 of first key 34 is positioned at a distal end of first key 34. First seal 42 is positioned adjacent the location in which first key 34 interfaces with first flange 32 and first seal 42 surrounds a circumference of first key 34. First seal 42 is configured to prevent debris from entering first electrical connector 18 when first electrical connector 18 is connected to second electrical connector 20. In the example shown, first seal 42 is an O-ring seal, but in another example, first seal 42 can be any component that prevents debris from entering first electrical connector 18 when first electrical connector 18 is connected to second electrical connector 20.

First end face 40 is configured to cover first metallic connector 44, preventing a user from touching first metallic connector 44. First metallic connector 44 is a female connector positioned within first body 30 and first key 34 of first electrical connector 18. First metallic connector 44 is the component that electrically couples first electrical connector 18 to second electrical connector 20, allowing electric current to transfer between each connector 18, 20. A user touching first metallic connector 44 and second metallic connector 64 of second electrical connector 20 at the same time can result in an electrical circuit being completed, which could shock or harm the user. As such, first end face 40 is configured to prevent the user from touching first metallic connector 44 and harming themselves during connecting or disconnecting of first electrical connector 18 and second electrical connector 20. First aperture 46 is axially aligned with first axis 48 and first aperture 46 extends through first end face 40. First aperture 46 allows access to first metallic connector 44, allowing second metallic connector 64 of second electrical connector 20 to interface with first metallic connector 44, discussed further below. First electrical connector 18 is configured to mate with second electrical connector 20 to complete an electrical circuit, allowing electric current to transfer from first electrical connector 18 to second electrical connector 20. Further, first electrical connector 18 is symmetric about a plane extending through a center axis of first threaded insert 36 and a center axis of second threaded insert 38, allowing first electrical connector 18 to be rotated 180 degrees about first axis 48 and still mate and couple with second electrical connector 20.

Referring to FIGS. 3A-3B, second electrical connector 20 includes second body 54, second flange 56, second key 58, first fastener 60, second fastener 62, second metallic connector 64, and second aperture 66. Second body 54 is the main body portion of second electrical connector 20 that the other components of second electrical connector 20 are coupled. Second flange 56 is positioned adjacent second body 54 and second flange 56 extends radially outward from second body 54. Second flange 56 includes apertures extending through second flange 56, in which first fastener 60 and second fastener 62 are positioned. First fastener 60 and second fastener 62 are configured to mate with first threaded insert 36 and second threaded insert 38 of first electrical connector 18, respectively. First fastener 60 is positioned 180 degrees from second fastener 62 about second axis 68.

Second key 58 is positioned within second flange 56 and second body 54. More specifically, second key 58 extends axially inward into second flange 56 and second body 54, with respect to second axis 68 extending through a center of second flange 56 and second body 54. Second key 58 is generally cylindrical in shape and includes first protrusion 70 and second protrusion 72 extending inward toward second axis 68. In the example shown, first protrusion 70 and second protrusion 72 include an arc or partial circle shaped protrusion extending inward from the cylindrically shaped second key 58. In another example, first protrusion 70 and second protrusion 72 can have any desired shape, as long as first protrusion 70 and second protrusion 72 have identical shaped geometry. First protrusion 70 is positioned 180 degrees from second protrusion 72 about second axis 68.

Second aperture 66 is axially aligned with second axis 68 and second aperture 66 extends into second body 54. Second aperture 66 provides a location in which second metallic connector 64 can be coupled. Second metallic connector 64 is a male connector positioned within second aperture 66 of second body 54 and second key 58 of second electrical connector 20. Second metallic connector 64 is the component that electrically couples second electrical connector 20 to first electrical connector 18, allowing electric current to transfer between each connector. More specifically, second metallic connector 64 of second electrical connector 20 is inserted into first metallic connector 44 of first electrical connector 18 to complete an electric circuit and to transfer electric current between first electrical connector 18 and second electrical connector 20. Second electrical connector 20 is configured to mate with and be coupled to first electrical connector 18 during operation of heated hose assembly 10, discussed further below. Further, second electrical connector 20 is symmetric about a plane extending through a center axis of first fastener 60 and a center axis of second fastener 62, allowing second electrical connector 20 to be rotated 180 degrees about second axis 68 and still mate and couple with first electrical connector 18.

Referring to FIGS. 4A-4B, first electrical connector 18 is shown disconnected from second electrical connector 20 (FIG. 4A) and first electrical connector 18 is shown connected to second electrical connector 20 (FIG. 4B). When first electrical connector 18 is disconnected from second electrical connector 20, the features and/or components of first electrical connector 18 are separated from second electrical connector 20 such that no electrical current is transferring between the connectors. When first electrical connector 18 is connected to second electrical connector 20, the features and/or components of first electrical connector 18 are contacting the features and/or components of second electrical connector 20 such that electrical current can transfer between the connectors.

More specifically, when first electrical connector 18 and second electrical connector 20 are connected, first flange 32 is adjacent and abuts second flange 56. First fastener 60 is inserted into and secured to first threaded insert 36 and second fastener 62 is inserted into and secured to second threaded insert 38. Securing fasteners 60, 62 to threaded inserts 36, 38 ensures that first electrical connector 18 and second electrical connector 20 will remain secured together during operation of heated hose assembly 10. First seal 42 is positioned and compressed between first flange 32 and second flange 56, producing a force that pushes first flange 32 and second flange 56 away from each other. The force produced by first seal 42 causes first fastener 60 and second fastener 62 to become tensioned, ensuring first fastener 60 and second fastener 62 remain secured to first threaded insert 36 and second threaded insert 38, respectively.

Further, when first electrical connector 18 and second electrical connector 20 are connected, first metallic connector 44 slides over and engages second metallic connector 64 such that first metallic connector 44 encompasses second metallic connector 64. The engagement of first metallic connector 44 and second metallic connector 64 creates an electric path, allowing electric current to transfer from first electrical connector 18 to second electrical connector 20, or vice versa. To ensure first electrical connector 18 is properly connected to second electrical connector 20, first key 34 is shaped to mate with second key 58 and first key 34 is inserted into second key 58. More specifically, first cutout 50 of first electrical connector 18 is shaped to accept first protrusion 70 of second electrical connector 20. Likewise, second cutout 52 of first electrical connector 18 is shaped to accept second protrusion 72 of second electrical connector 20.

The geometry of first cutout 50 is identical to second cutout 52 and the geometry of first protrusion 70 is identical to second protrusion 72. As such, first electrical connector 18 can be rotated 180 degrees about first axis 48 and first electrical connector 18 and second electrical connector 20 can still mate and connect. In this configuration, first cutout 50 of first electrical connector 18 can accept second protrusion 72 of second electrical connector 20 and second cutout 52 of first electrical connector 18 can accept first protrusion 70 of second electrical connector 20. First key 34 and second key 58 have mating first cutout 50, second cutout 52, first protrusion 70, and second protrusion 72, ensuring that first electrical connector 18 and second electrical connector 20 are correctly connected to each other and the full amount of electrical current can transfer through connectors 18, 20.

Figure 6B:
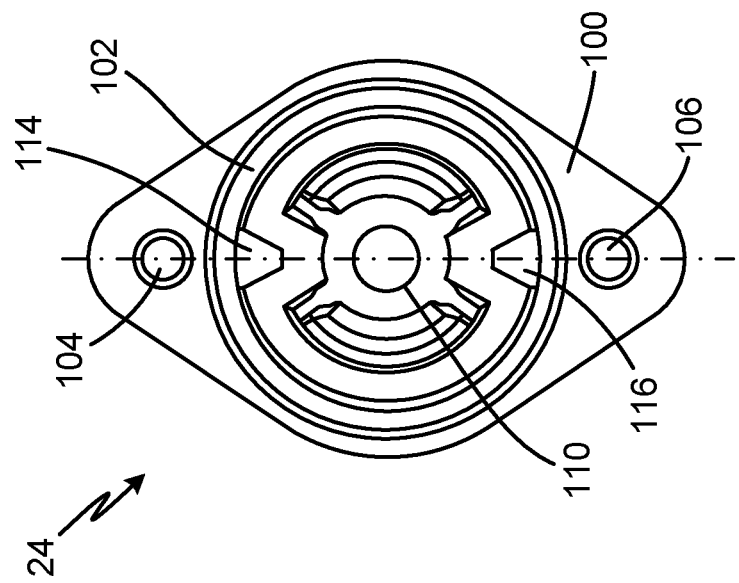
FIG. 6B is a front view of the fourth electrical connector.
Figure 6A:
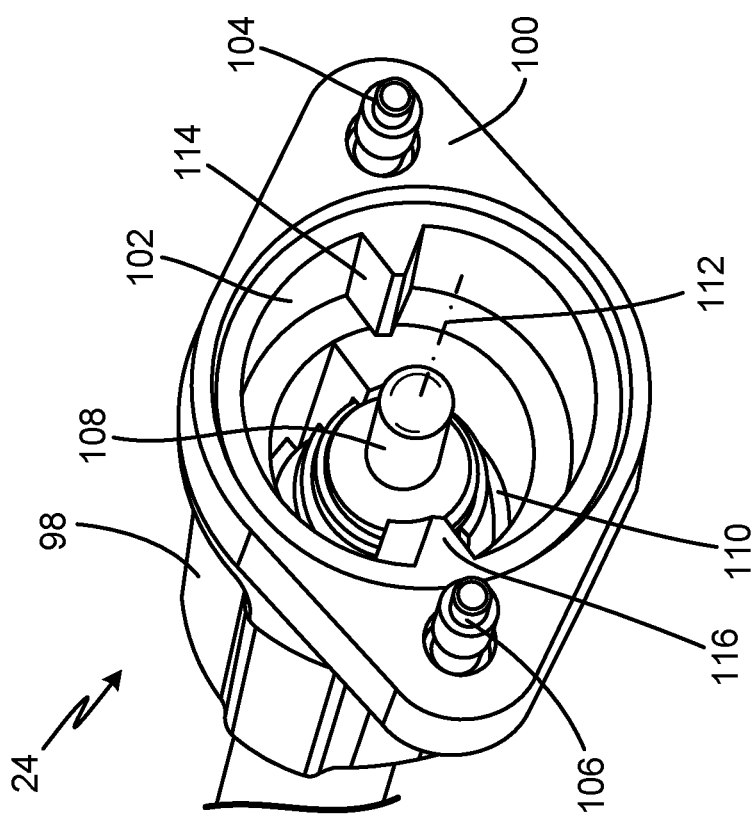
FIG. 6A is a perspective view of a fourth electrical connector.

FIG. 5A is a perspective view of third electrical connector 22. FIG. 5B is a front view of third electrical connector 22. FIG. 6A is a perspective view of fourth electrical connector 24. FIG. 6B is a front view of fourth electrical connector 24. FIG. 7A is a cross-sectional view of third electrical connector 22 and fourth electrical connector 24 disconnected. FIG. 7B is a cross-sectional view of third electrical connector 22 and fourth electrical connector 24 connected. FIGS. 5A-7B will be discussed together.

Referring to FIGS. 5A-5B, third electrical connector 22 includes third body 74, third flange 76, third key 78, third threaded insert 80, fourth threaded insert 82, third end face 84, second seal 86, third metallic connector 88, and third aperture 90. Third body 74 is the main body portion of third electrical connector 22 that the other components of third electrical connector 22 are coupled. Third flange 76 is positioned adjacent third body 74 and third flange 76 extends radially outward from third body 74. Third flange 76 includes apertures extending through third flange 76, in which third threaded insert 80 and fourth threaded insert 82 are positioned. Third threaded insert 80 and fourth threaded insert 82 are configured to accept and mate with fasteners, discussed further below. Third threaded insert 80 is positioned 180 degrees from fourth threaded insert 82 about third axis 92. In some examples, third threaded insert 80 and fourth threaded insert 82 can be molded into third flange 76 during manufacturing of third electrical connector 22. In other examples, third threaded insert 80 and fourth threaded insert 82 can be coupled to third flange 76 after manufacturing of third electrical connector 22.

Third key 78 is positioned adjacent third flange 76 and third key 78 extends axially outward from third flange 76 and third body 74, with respect to third axis 92 extending through a center of third flange 76 and third body 74. Third key 78 is generally cylindrical in shape and includes third cutout 94 and fourth cutout 96 extending from third end face 84 of third key 78 to third flange 76. In the example shown, third cutout 94 and fourth cutout 96 include a generally triangular shaped cutout extending into the cylindrically shaped third key 78. In another example, third cutout 94 and fourth cutout 96 can have any desired shape, as long as third cutout 94 and fourth cutout 96 have identical shaped geometry. Third cutout 94 is positioned 180 degrees from fourth cutout 96 about third axis 92. Third end face 84 of third key 78 is positioned at a distal end of third key 78. Second seal 86 is positioned adjacent the location in which third key 78 interfaces with third flange 76 and second seal 86 surrounds a circumference of third key 78. Second seal 86 is configured to prevent debris from entering third electrical connector 22 when third electrical connector 22 is connected to fourth electrical connector 24. In the example shown, second seal 86 is an O-ring seal, but in another example, second seal 86 can be any component that prevents debris from entering third electrical connector 22 when third electrical connector 22 is connected to fourth electrical connector 24.

Third end face 84 is configured to cover third metallic connector 88, preventing a user from touching third metallic connector 88. Third metallic connector 88 is a female connector positioned within third body 74 and third key 78 of third electrical connector 22. Third metallic connector 88 is the component that electrically couples third electrical connector 22 to fourth electrical connector 24, allowing electric current to transfer between each connector. A user touching third metallic connector 88 and fourth metallic connector 108 of fourth electrical connector 24 at the same time can result in an electrical circuit being completed, which could shock or harm the user. As such, third end face 84 is configured to prevent the user from touching third metallic connector 88 and harming themselves during connecting or disconnecting of third electrical connector 22 and fourth electrical connector 24. Third aperture 90 is axially aligned with third axis 92 and third aperture 90 extends through third end face 84. Third aperture 90 allows access to third metallic connector 88, allowing fourth metallic connector 108 of fourth electrical connector 24 to interface with third metallic connector 88, discussed further below. Third electrical connector 22 is configured to mate with fourth electrical connector 24 to complete an electrical circuit, allowing electric current to transfer from third electrical connector 22 to fourth electrical connector 24. Further, third electrical connector 22 is symmetric about a plane extending through a center axis of third threaded insert 80 and a center axis of fourth threaded insert 82, allowing third electrical connector 22 to be rotated 180 degrees about third axis 92 and still mate and couple with fourth electrical connector 24.

Referring to FIGS. 6A-6B, fourth electrical connector 24 includes fourth body 98, fourth flange 100, fourth key 102, third fastener 104, fourth fastener 106, fourth metallic connector 108, and fourth aperture 110. Fourth body 98 is the main body portion of fourth electrical connector 24 that the other components of fourth electrical connector 24 are coupled. Fourth flange 100 is positioned adjacent fourth body 98 and fourth flange 100 extends radially outward from fourth body 98. Fourth flange 100 includes apertures extending through fourth flange 100, in which third fastener 104 and fourth fastener 106 are positioned. Third fastener 104 and fourth fastener 106 are configured to mate with third threaded insert 80 and fourth threaded insert 82 of third electrical connector 22, respectively. Third fastener 104 is positioned 180 degrees from fourth fastener 106 about fourth axis 112.

Fourth key 102 is positioned within fourth flange 100 and fourth body 98. More specifically, fourth key 102 extends axially inward into fourth flange 100 and fourth body 98, with respect to fourth axis 112 extending through a center of fourth flange 100 and fourth body 98. Fourth key 102 is generally cylindrical in shape and includes third protrusion 114 and fourth protrusion 116 extending inward toward fourth axis 112. In the example shown, third protrusion 114 and fourth protrusion 116 include a generally triangular shaped protrusion extending inward from the cylindrically shaped fourth key 102. In another example, third protrusion 114 and fourth protrusion 116 can have any desired shape, as long as third protrusion 114 and fourth protrusion 116 have identical shaped geometry. Third protrusion 114 is positioned 180 degrees from fourth protrusion 116 about fourth axis 112.

Fourth aperture 110 is axially aligned with fourth axis 112 and fourth aperture 110 extends into fourth body 98. Fourth aperture 110 provides a location in which fourth metallic connector 108 can be coupled. Fourth metallic connector 108 is a male connector positioned within fourth aperture 110 of fourth body 98 and fourth key 102 of fourth electrical connector 24. Fourth metallic connector 108 is the component that electrically couples fourth electrical connector 24 to third electrical connector 22, allowing electric current to transfer between each connector. More specifically, fourth metallic connector 108 of fourth electrical connector 24 is inserted into third metallic connector 88 of third electrical connector 22 to complete an electric circuit and to transfer electric current between third electrical connector 22 and fourth electrical connector 24. Fourth electrical connector 24 is configured to mate with and be coupled to third electrical connector 22 during operation of heated hose assembly 10, discussed further below. Further, fourth electrical connector 24 is symmetric about a plane extending through a center axis of third fastener 104 and a center axis of fourth fastener 106, allowing fourth electrical connector 24 to be rotated 180 degrees about fourth axis 112 and still mate and couple with third electrical connector 22.

Referring to FIGS. 7A-7B, third electrical connector 22 is shown disconnected from fourth electrical connector 24 (FIG. 7A) and third electrical connector 22 is shown connected to fourth electrical connector 24 (FIG. 7B). When third electrical connector 22 is disconnected from fourth electrical connector 24, the features and/or components of third electrical connector 22 are separated from fourth electrical connector 24 such that no electrical current is transferring between the connectors. When third electrical connector 22 is connected to fourth electrical connector 24, the features and/or components of third electrical connector 22 are contacting the features and/or components of fourth electrical connector 24 such that electrical current can transfer between the connectors.

More specifically, when third electrical connector 22 and fourth electrical connector 24 are connected, third flange 76 is adjacent and abuts fourth flange 100. Third fastener 104 is inserted into and secured to third threaded insert 80 and fourth fastener 106 is inserted into and secured to fourth threaded insert 82. Securing fasteners 60, 62 to threaded inserts 36, 38 ensures that third electrical connector 22 and fourth electrical connector 24 will remain secured together during operation of heated hose assembly 10. Second seal 86 is positioned and compressed between third flange 76 and fourth flange 100, producing a force that pushes third flange 76 and fourth flange 100 away from each other. The force produced by second seal 86 causes third fastener 104 and fourth fastener 106 to become tensioned, ensuring third fastener 104 and fourth fastener 106 remain secured to third threaded insert 80 and fourth threaded insert 82, respectively.

Further, when third electrical connector 22 and fourth electrical connector 24 are connected, third metallic connector 88 slides over and engages fourth metallic connector 108 such that third metallic connector 88 encompasses fourth metallic connector 108. The engagement of third metallic connector 88 and fourth metallic connector 108 creates an electric path, allowing electric current to transfer from third electrical connector 22 to fourth electrical connector 24, or vice versa. To ensure third electrical connector 22 is properly connected to fourth electrical connector 24, third key 78 is shaped to mate with fourth key 102 and third key 78 is inserted into fourth key 102. More specifically, third cutout 94 of third electrical connector 22 is shaped to accept third protrusion 114 of fourth electrical connector 24. Likewise, fourth cutout 96 of third electrical connector 22 is shaped to accept fourth protrusion 116 of fourth electrical connector 24.

The geometry of third cutout 94 is identical to fourth cutout 96 and the geometry of third protrusion 114 is identical to fourth protrusion 116. As such, third electrical connector 22 can be rotated 180 degrees about third axis 92 and third electrical connector 22 and fourth electrical connector 24 can still mate and connect. In this configuration, third cutout 94 of third electrical connector 22 can accept fourth protrusion 116 of fourth electrical connector 24 and fourth cutout 96 of third electrical connector 22 can accept third protrusion 114 of fourth electrical connector 24. Third key 78 and fourth key 102 have mating third cutout 94, fourth cutout 96, third protrusion 114, and fourth protrusion 116, ensuring that third electrical connector 22 and fourth electrical connector 24 are correctly connected to each other and the full amount of electrical current can flow through connectors 22, 24.

As discussed, first key 34 of first electrical connector 18 is configured to mate with second key 58 of second electrical connector 20. More specifically, first cutout 50 and second cutout 52 of first electrical connector 18 are shaped to mate with first protrusion 70 and second protrusion 72 of second electrical connector 20. Likewise, third key 78 of third electrical connector 22 is configured to mate with fourth key 102 of fourth electrical connector 24. More specifically, third cutout 94 and fourth cutout 96 of third electrical connector 22 are shaped to mate with third protrusion 114 and fourth protrusion 116 of fourth electrical connector 24. Therefore, first key 34, second key 58, third key 78, and fourth key 102 ensure first electrical connector 18 and second electrical connector 20 are correctly connected, and ensure third electrical connector 22 and fourth electrical connector 24 are correctly connected. Further, first key 34, second key 58, third key 78, and fourth key 102 prevent first electrical connector 18 from connecting with fourth electrical connector 24, and prevent third electrical connector 22 from connecting with second electrical connector 20.

First electrical connector 18 includes first key 34 with a geometry that differs from the geometry of third key 78 of third electrical connector 22. Further, first electrical connector 18 includes first key 34 with a geometry that cannot mate with the geometry of fourth key 102 of fourth electrical connector 24. More specifically, first cutout 50 and second cutout 52 of first electrical connector 18 include a geometry that does not conform and mate with third protrusion 114 and fourth protrusion 116 of fourth electrical connector 24. As such, first key 34 and fourth key 102 cannot be connected, preventing first electrical connector 18 and fourth electrical connector 24 from being electrically coupled. Similarly, third electrical connector 22 includes third key 78 with a geometry that differs from the geometry of first key 34 of first electrical connector 18. Further, third electrical connector 22 includes third key 78 with a geometry that cannot mate with the geometry of second key 58 of second electrical connector 20. More specifically, third cutout 94 and fourth cutout 96 of third electrical connector 22 include a geometry that does not conform and mate with first protrusion 70 and second protrusion 72 of second electrical connector 20. As such, third key 78 and second key 58 cannot be connected, preventing third electrical connector 22 and second electrical connector 20 from being electrically coupled.

Electrical connectors 18, 20, 22, and 24 including keys 34, 58, 78, and 102, respectively, ensure that electrical connector system 12 of heated hose assembly 10 is connected correctly. In turn, this ensure that electrical current and power is supplied to sufficiently heat first heated hose 14 and second heated hose 16. The geometry of keys 34, 58, 78, and 102 allows a user to easily and repeatedly connect electrical connectors 18, 20, 22, and 24. Further, first end face 40 and third end face 84 prevent a user from touching first metallic connector 44 and third electrical connector 22, preventing a user from completing the electrical circuit and electrocuting themselves or others. Additionally, first threaded insert 36, second threaded insert 38, first fastener 60, and second fastener 62 ensure connectors 18, 20, 22, and 24 remain secured together during operation of heated hose assembly 10, providing electric current to first heated hose 14 and second heated hose 16. Electrical connectors 18, 20, 22, and 24 can be constructed from one or more of a glass filled nylon, a glass filled plastic, and other composite materials, to meet nationally recognized safety and sustainability standards. Electrical connectors 18, 20, 22, and 24 include keys 34, 58, 78, and 102, respectively, including different mating geometries, ensuring connectors 18, 20, 22, and 24 can only be connected in the correct configuration to provide the requisite electrical current and power to the independently heated first heated hose 14 and second heated hose 16.

Heated hose assembly 10 utilizes electrical connector system 12 to increase the temperature of the first fluid component and the second fluid component flowing through the conduits of first heated hose 14 and second heated hose 16, respectively. An example method of operating heated hose assembly 10 can include providing first heated hose 14 configured to transfer a first fluid component, first heated hose 14 comprising first electrical connector 18 and second electrical connector 20 each electrically coupled to heating elements of first heated hose 14. Providing second heated hose 16 configured to transfer a second fluid component, second heated hose 16 comprising third electrical connector 22 and fourth electrical connector 24 each electrically coupled to heating elements of second heated hose 16. Electrically coupling first electrical connector 18 to second electrical connector 20 such that first key 34 of first electrical connector 18 mates with second key 58 of second electrical connector 20. Electrically coupling third electrical connector 22 to fourth electrical connector 24 such that third key 78 of third electrical connector 22 mates with fourth key 102 of fourth electrical connector 24. Supplying a first electric current through first electrical connector 18 and second electrical connector 20 to increase a temperature of the first fluid component transferring through first heated hose 14. Supplying a second electric current through third electrical connector 22 and fourth electrical connector 24 to increase a temperature of the second fluid component transferring through second heated hose 16.

The method can further include providing first threaded insert 36 and second threaded insert 38 within first flange 32 of first electrical connector 18. Providing first fastener 60 and second fastener 62 extending through second flange 56 of second electrical connector 20. Threading first fastener 60 and second fastener 62 into first threaded insert 36 and second threaded insert 38, respectively, to couple first electrical connector 18 to second electrical connector 20. Providing third threaded insert 80 and fourth threaded insert 82 within third flange 76 of third electrical connector 22. Providing third fastener 104 and fourth fastener 106 extending through fourth flange 100 of fourth electrical connector 24. Threading third fastener 104 and fourth fastener 106 into third threaded insert 80 and fourth threaded insert 82, respectively, to couple third electrical connector 22 to fourth electrical connector 24. It is to be understood that the preceding method steps for increasing the temperature of first heated hose 14 and second heated hose 16 are only example steps and the method can include other steps not specifically described.

Discussion of Non-Exclusive Examples

The following are non-exclusive descriptions of possible examples of the present invention.

An electrical connector system comprising: a first electrical connector comprising a first key; a second electrical connector comprising a second key shaped to mate with the first key; a third electrical connector comprising a third key; and a fourth electrical connector comprising a fourth key shaped to mate with the third key; wherein a geometry of the first key differs from a geometry of the third key, and wherein a geometry of the second key differs from a geometry of the fourth key.

The electrical connector system of the preceding paragraph can optionally include, additionally and/or alternatively, any one or more of the following features, configurations and/or additional components:

The first electrical connector is a male connector and the second electrical connector is a female connector, and wherein the first electrical connector is configured to mate and connect with the second electrical connector.

The third electrical connector is a male connector and the fourth electrical connector is a female connector, and wherein the third electrical connector is configured to mate and connect with the fourth electrical connector.

The first electrical connector further comprises a first body and a first flange extending radially outward from the first body; and the second electrical connector further comprises a second body and a second flange extending radially outward from the second body.

A first threaded insert and a second threaded insert are positioned within the first flange of the first electrical connector; and a first fastener and a second fastener are positioned within and extend through the second flange of the second electrical connector.

The first threaded insert is coupled to the first fastener when the first electrical connector and the second electrical connector are connected; and the second threaded insert is coupled to the second fastener when the first electrical connector and the second electrical connector are connected.

The third electrical connector further comprises a third body and a third flange extending radially outward from the third body; and the fourth electrical connector further comprises a fourth body and a fourth flange extending radially outward from the fourth body.

A third threaded insert and a fourth threaded insert are positioned within the third flange of the third electrical connector; and a third fastener and a fourth fastener are positioned within and extend through the fourth flange of the fourth electrical connector.

The third threaded insert is coupled to the third fastener when the third electrical connector and the fourth electrical connector are connected; and the fourth threaded insert is coupled to the fourth fastener when the third electrical connector and the fourth electrical connector are connected.

The first key comprises a first cutout and a second cutout extending from a first end face of the first electrical connector to a first flange of the first electrical connector; and the second key comprises a first protrusion and a second protrusion extending into a second aperture of a second body of the second electrical connector.

The first cutout is positioned 180 degrees from the second cutout about a first axis extending through a first aperture of the first electrical connector; and the first protrusion is positioned 180 degrees from the second protrusion about a second axis extending through the second aperture of the second electrical connector.

The first cutout includes a geometry identical to the second cutout; the first protrusion includes a geometry identical to the second protrusion; the first cutout is shaped to accept the first protrusion and the second cutout is shaped to accept the second protrusion; and the first cutout is shaped to accept the second protrusion and the second cutout is shaped to accept the first protrusion.

The third key comprises a third cutout and a fourth cutout extending from a third end face of the third electrical connector to a third flange of the third electrical connector; and the fourth key comprises a third protrusion and a fourth protrusion extending into a fourth aperture of a fourth body of the fourth electrical connector.

The third cutout is positioned 180 degrees from the fourth cutout about a third axis extending through a third aperture of the third electrical connector; and the third protrusion is positioned 180 degrees from the fourth protrusion about a fourth axis extending through the fourth aperture of the fourth electrical connector.

The third cutout includes a geometry identical to the fourth cutout; the third protrusion includes a geometry identical to the fourth protrusion; the third cutout is shaped to accept the third protrusion and the fourth cutout is shaped to accept the fourth protrusion; and the third cutout is shaped to accept the fourth protrusion and the fourth cutout is shaped to accept the third protrusion.

The geometry of the first cutout differs from the third cutout and the fourth cutout; the geometry of the second cutout differs from the third cutout and the fourth cutout; the geometry of the first protrusion differs from the third protrusion and the fourth protrusion; and the geometry of the second protrusion differs from the third protrusion and the fourth protrusion.

The following are further non-exclusive descriptions of possible examples of the present invention.

A heated hose assembly comprising: a first heated hose configured to transfer a first fluid component; a second heated hose configured to transfer a second fluid component; a first electrical connector electrically coupled to heating elements of the first heated hose, the first electrical connector comprising a first key; a second electrical connector electrically coupled to heating elements of the first heated hose, the second electrical connector comprising a second key shaped to mate with the first key; a third electrical connector electrically coupled to heating elements of the second heated hose, the third electrical connector comprising a third key; a fourth electrical connector electrically coupled to heating elements of the second heated hose, the fourth electrical connector comprising a fourth key shaped to mate with the third key.

The heated hose assembly of the preceding paragraph can optionally include, additionally and/or alternatively, any one or more of the following features, configurations and/or additional components:

The first electrical connector further comprises a first body, a first flange extending radially outward from the first body, a first threaded insert positioned within the first flange, and a second threaded insert positioned within the flange; and the second electrical connector further comprises a second body, a second flange extending radially outward from the second body, a first fastener extending through the second flange, and a second fastener extending through the second flange.

The first electrical connector is symmetric about a plane extending through a center axis of the first threaded insert and a center axis of the second threaded insert; and the second electrical connector is symmetric about a plane extending through a center axis of the first fastener and a center axis of the second fastener.

The first key of the first electrical connector comprises a first cutout and a second cutout having identical geometry; the second key of the second electrical connector comprises a first protrusion and a second protrusion having identical geometry; the third key of the third electrical connector comprises a third cutout and a fourth cutout having identical geometry; the fourth key of the fourth electrical connector comprises a third protrusion and a fourth protrusion having identical geometry; the first cutout is shaped to accept the first protrusion and the second cutout is shaped to accept the second protrusion; the third cutout is shaped to accept the third protrusion and the fourth cutout is shaped to accept the fourth protrusion; the geometry of the first cutout differs from the geometry of the third cutout and the geometry of fourth cutout; and the geometry of the first protrusion differs from the geometry of the third protrusion and the geometry of the fourth protrusion.

The following are further non-exclusive descriptions of possible examples of the present invention.

A method of operating a heated hose assembly, the method comprising: providing a first heated hose configured to transfer a first fluid component, the first heated hose comprising a first electrical connector and a second electrical connector each electrically coupled to heating elements of the first heated hose; providing a second heated hose configured to transfer a second fluid component, the second heated hose comprising a third electrical connector and a fourth electrical connector each electrically coupled to heating elements of the second heated hose; electrically coupling the first electrical connector to the second electrical connector such that a first key of the first electrical connector mates with a second key of the second electrical connector; electrically coupling the third electrical connector to the fourth electrical connector such that a third key of the third electrical connector mates with a fourth key of the fourth electrical connector; supplying a first electric current through the first electrical connector and the second electrical connector to increase a temperature of the first fluid component transferring through the first heated hose; and supplying a second electric current through the third electrical connector and the fourth electrical connector to increase a temperature of the second fluid component transferring through the second heated hose.

The method of the preceding paragraph can optionally include, additionally and/or alternatively, any one or more of the following features, configurations and/or additional components:

Providing a first threaded insert and a second threaded insert within a first flange of the first electrical connector; providing a first fastener and a second fastener extending through a second flange of the second electrical connector; threading the first fastener and the second fastener into the first threaded insert and the second threaded insert, respectively, to couple the first electrical connector to the second electrical connector; providing a third threaded insert and a fourth threaded insert within a third flange of the third electrical connector; providing a third fastener and a fourth fastener extending through a fourth flange of the fourth electrical connector; and threading the third fastener and the fourth fastener into the third threaded insert and the fourth threaded insert, respectively, to couple the third electrical connector to the fourth electrical connector.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An electrical connector system comprising:
a first electrical connector comprising a first key;
a second electrical connector comprising a second key shaped to mate with the first key;
a third electrical connector comprising a third key; and
a fourth electrical connector comprising a fourth key shaped to mate with the third key;
wherein a geometry of the first key differs from a geometry of the third key, and wherein a geometry of the second key differs from a geometry of the fourth key.

2. The electrical connector system of claim 1, wherein:
the first electrical connector is a male connector and the second electrical connector is a female connector;
the first electrical connector is configured to mate and connect with the second electrical connector;
the third electrical connector is a male connector and the fourth electrical connector is a female connector; and
the third electrical connector is configured to mate and connect with the fourth electrical connector.

3. The electrical connector system of claim 1, wherein:
the first key comprises a first cutout and a second cutout extending from a first end face of the first electrical connector to a first flange of the first electrical connector; and
the second key comprises a first protrusion and a second protrusion extending into a second aperture of a second body of the second electrical connector.

4. The electrical connector system of claim 3, wherein:
the first cutout is positioned 180 degrees from the second cutout about a first axis extending through a first aperture of the first electrical connector; and
the first protrusion is positioned 180 degrees from the second protrusion about a second axis extending through the second aperture of the second electrical connector.

5. The electrical connector system of claim 3, wherein:
the first cutout includes a geometry identical to the second cutout;
the first protrusion includes a geometry identical to the second protrusion;
the first cutout is shaped to accept the first protrusion and the second cutout is shaped to accept the second protrusion; and
the first cutout is shaped to accept the second protrusion and the second cutout is shaped to accept the first protrusion.

6. The electrical connector system of claim 3, wherein:
the third key comprises a third cutout and a fourth cutout extending from a third end face of the third electrical connector to a third flange of the third electrical connector; and
the fourth key comprises a third protrusion and a fourth protrusion extending into a fourth aperture of a fourth body of the fourth electrical connector.

7. The electrical connector system of claim 6, wherein:
the third cutout is positioned 180 degrees from the fourth cutout about a third axis extending through a third aperture of the third electrical connector; and
the third protrusion is positioned 180 degrees from the fourth protrusion about a fourth axis extending through the fourth aperture of the fourth electrical connector.

8. The electrical connector system of claim 6, wherein:
the third cutout includes a geometry identical to the fourth cutout;
the third protrusion includes a geometry identical to the fourth protrusion;
the third cutout is shaped to accept the third protrusion and the fourth cutout is shaped to accept the fourth protrusion; and
the third cutout is shaped to accept the fourth protrusion and the fourth cutout is shaped to accept the third protrusion.

9. The electrical connector system of claim 8, wherein:
the geometry of the first cutout differs from the third cutout and the fourth cutout;
the geometry of the second cutout differs from the third cutout and the fourth cutout;
the geometry of the first protrusion differs from the third protrusion and the fourth protrusion; and
the geometry of the second protrusion differs from the third protrusion and the fourth protrusion.

10. The electrical connector system of claim 1, wherein:
the first electrical connector further comprises a first body and a first flange extending radially outward from the first body; and
the second electrical connector further comprises a second body and a second flange extending radially outward from the second body.

11. The electrical connector system of claim 10, wherein:
a first threaded insert and a second threaded insert are positioned within the first flange of the first electrical connector; and
a first fastener and a second fastener are positioned within and extend through the second flange of the second electrical connector.

12. The electrical connector system of claim 11, wherein:
the first threaded insert is coupled to the first fastener when the first electrical connector and the second electrical connector are connected; and
the second threaded insert is coupled to the second fastener when the first electrical connector and the second electrical connector are connected.

13. The electrical connector system of claim 1, wherein:
the third electrical connector further comprises a third body and a third flange extending radially outward from the third body; and
the fourth electrical connector further comprises a fourth body and a fourth flange extending radially outward from the fourth body.

14. The electrical connector system of claim 13, wherein:
a third threaded insert and a fourth threaded insert are positioned within the third flange of the third electrical connector; and
a third fastener and a fourth fastener are positioned within and extend through the fourth flange of the fourth electrical connector.

15. The electrical connector system of claim 14, wherein:
the third threaded insert is coupled to the third fastener when the third electrical connector and the fourth electrical connector are connected; and
the fourth threaded insert is coupled to the fourth fastener when the third electrical connector and the fourth electrical connector are connected.

16. A heated hose assembly comprising:
a first heated hose configured to transfer a first fluid component;
a second heated hose configured to transfer a second fluid component;
a first electrical connector electrically coupled to heating elements of the first heated hose, the first electrical connector comprising a first key;
a second electrical connector electrically coupled to heating elements of the first heated hose, the second electrical connector comprising a second key shaped to mate with the first key;
a third electrical connector electrically coupled to heating elements of the second heated hose, the third electrical connector comprising a third key;
a fourth electrical connector electrically coupled to heating elements of the second heated hose, the fourth electrical connector comprising a fourth key shaped to mate with the third key.

17. The heated hose assembly of claim 16, wherein:
the first key of the first electrical connector comprises a first cutout and a second cutout having identical geometry;
the second key of the second electrical connector comprises a first protrusion and a second protrusion having identical geometry;
the third key of the third electrical connector comprises a third cutout and a fourth cutout having identical geometry;
the fourth key of the fourth electrical connector comprises a third protrusion and a fourth protrusion having identical geometry;
the first cutout is shaped to accept the first protrusion and the second cutout is shaped to accept the second protrusion;
the third cutout is shaped to accept the third protrusion and the fourth cutout is shaped to accept the fourth protrusion;
the geometry of the first cutout differs from the geometry of the third cutout and the geometry of fourth cutout; and
the geometry of the first protrusion differs from the geometry of the third protrusion and the geometry of the fourth protrusion.

18. The heated hose assembly of claim 16, wherein:
the first electrical connector further comprises a first body, a first flange extending radially outward from the first body, a first threaded insert positioned within the first flange, and a second threaded insert positioned within the flange; and
the second electrical connector further comprises a second body, a second flange extending radially outward from the second body, a first fastener extending through the second flange, and a second fastener extending through the second flange.

19. The heated hose assembly of claim 18, wherein:
the first electrical connector is symmetric about a plane extending through a center axis of the first threaded insert and a center axis of the second threaded insert; and
the second electrical connector is symmetric about a plane extending through a center axis of the first fastener and a center axis of the second fastener.

20. A method of operating a heated hose assembly, the method comprising:
providing a first heated hose configured to transfer a first fluid component, the first heated hose comprising a first electrical connector and a second electrical connector each electrically coupled to heating elements of the first heated hose;
providing a second heated hose configured to transfer a second fluid component, the second heated hose comprising a third electrical connector and a fourth electrical connector each electrically coupled to heating elements of the second heated hose;

electrically coupling the first electrical connector to the second electrical connector such that a first key of the first electrical connector mates with a second key of the second electrical connector;

electrically coupling the third electrical connector to the fourth electrical connector such that a third key of the third electrical connector mates with a fourth key of the fourth electrical connector;

supplying a first electric current through the first electrical connector and the second electrical connector to increase a temperature of the first fluid component transferring through the first heated hose; and supplying a second electric current through the third electrical connector and the fourth electrical connector to increase a temperature of the second fluid component transferring through the second heated hose.

\* \* \* \* \*